United States Patent [19]
Kirsch

[11] 4,201,313
[45] May 6, 1980

[54] HOPPER FEEDER FOR SINGLY DISPENSING SHORT RODS OR TUBES

[75] Inventor: Jerry Kirsch, Grosse Pointe Farms, Mich.

[73] Assignee: Auto-Place, Inc., Troy, Mich.

[21] Appl. No.: 876,019

[22] Filed: Feb. 8, 1978

[51] Int. Cl.² .................. B23Q 7/06; B65H 3/24; B65H 9/00
[52] U.S. Cl. .................. 221/171; 198/389; 198/396; 221/195; 221/200
[58] Field of Search .............. 221/164, 165, 183, 195, 221/200, 202, 256, 257, 171; 198/389, 396

[56] References Cited

U.S. PATENT DOCUMENTS

| 728,522 | 5/1903 | Ulbricht | 221/256 |
| 1,496,080 | 6/1924 | Alderman | 198/396 |
| 2,177,188 | 10/1939 | Pengilly | 221/202 X |
| 2,469,233 | 5/1949 | Kozachuk | 221/165 |
| 3,016,166 | 1/1962 | Furst | 221/200 |

*Primary Examiner*—F. J. Bartuska
*Attorney, Agent, or Firm*—Willis Bugbee

[57] ABSTRACT

For feeding short rods, which term includes tubes, such as clinical thermometer tubes with bulbs at one end, a feeding hopper has downwardly-converging bottom walls terminating in an elongated gap between their lower edges forming an elongated slot. Reciprocable horizontally beneath the slot is fluid-pressure-operated ejector plunger which feeds, one at a time, the short rods to a horizontal receiver composed of a pair of spaced parallel guide bars separated by a distance large enough to pass the rod but to detain the bulb, whereupon the rod pivots around the detained bulb to swing downward into the slot and comes to rest between the bars with the bulb uppermost and the rod suspended vertically from the bars. Agitating mechanism including a pair of alternately-reciprocable agitator slides mounted side by side in spaced relationship beneath the gap to closely select and receive the rods one at a time by moving upward and downward through the slot and, also intermittently shakes the stack of rods in the hopper so as to force them into mutually parallel horizontal positions, thereby preventing jamming of the rods in or arching together above the slot.

4 Claims, 5 Drawing Figures

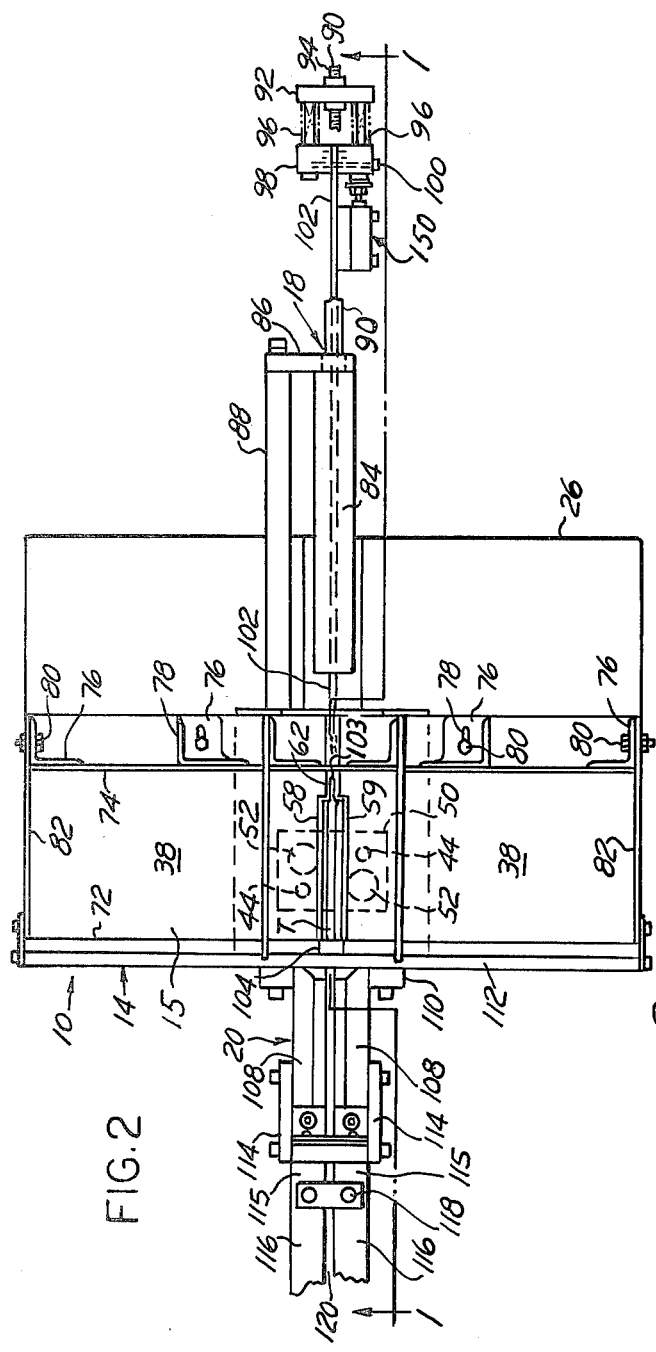
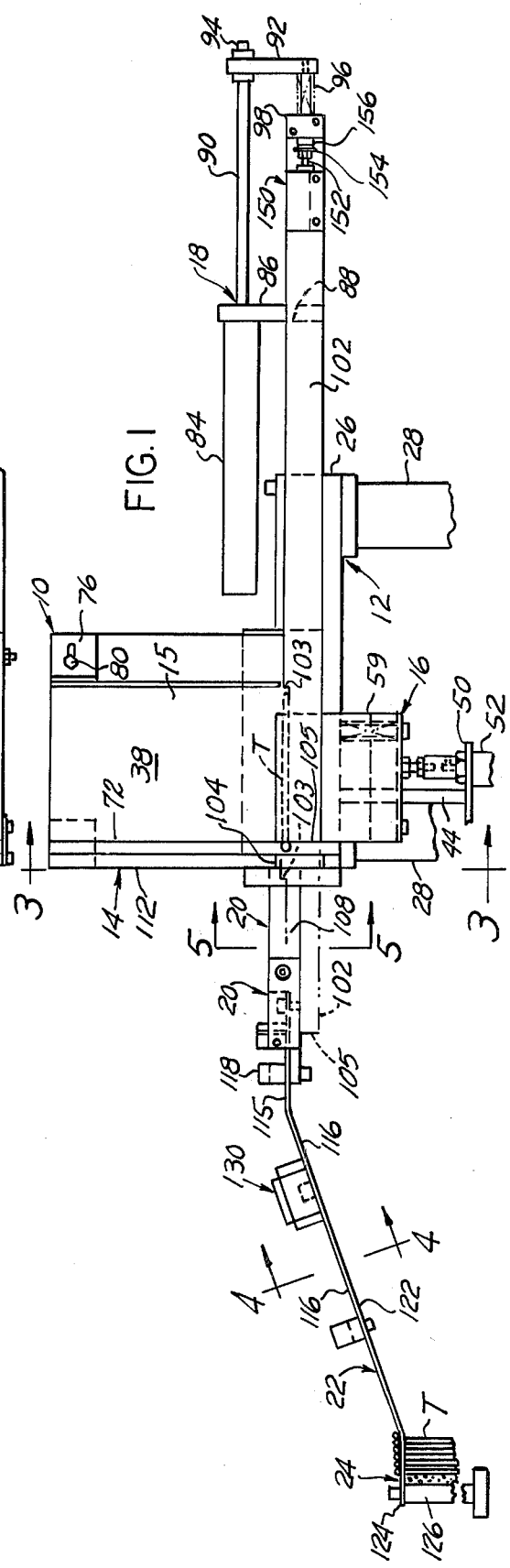

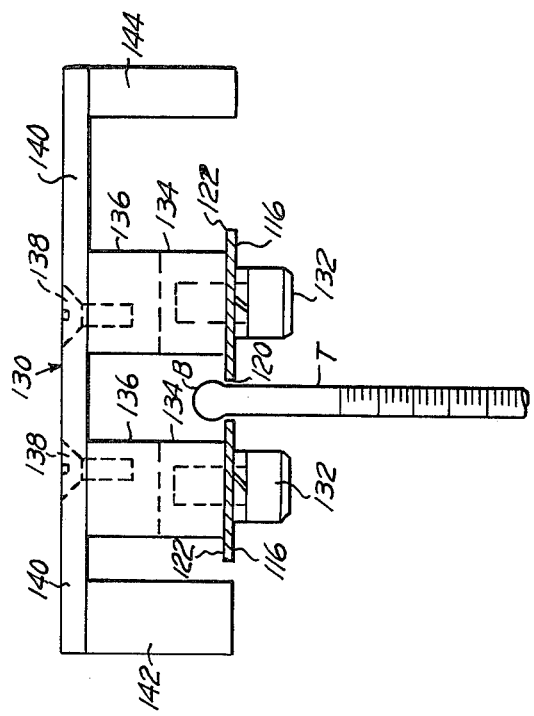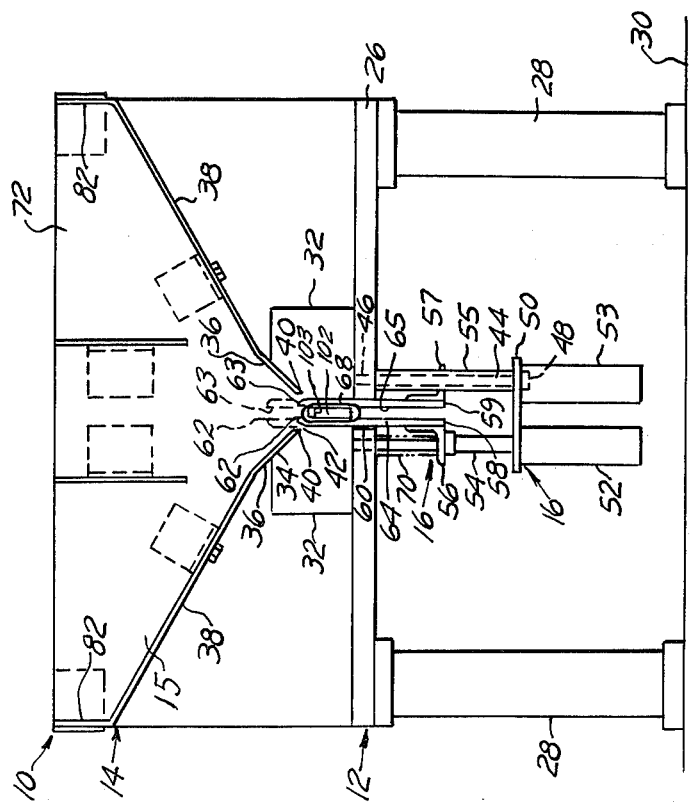

HOPPER FEEDER FOR SINGLY DISPENSING SHORT RODS OR TUBES

BACKGROUND OF THE INVENTION

Certain workpieces in the form of short rods have presented difficulties in handling them or in performing the various operations and inspections involved in their manufacture. These problems are particularly acute in the manufacture of thermometers, especially clinical thermometers where the workpiece is a tube which is not only slippery to handle but also is fragile and contains metallic mercury. These clinical thermometers, when placed in a dispensing machine such as a hooper, tend to jam and resist rearrangement yet their fragile nature prevents their being capable of rough handling to disentangle a jammed assembly in a hopper. Furthermore, the manufacturing requirements of such clinical thermometers require that they be capable of being handled rapidly in order to keep up with the remainder of the manufacturing schedule. The present invention was evolved for the solution of these problems and successfully solves them. It enables the thermometers to be loaded into the hooper in large numbers yet fed therefrom outward one-by-one to a horizontal receiver at a rate of one per second without a jamming rate greater than one thermometer for every thousand thermometers handled.

SUMMARY OF THE INVENTION

The invention principally resides in the cooperation of the agitator with the slot between the spaced lower edges of the downwardly-sloping sides of the hooper to cause the single-headed short rods such as thermometer tubes to constantly assume horizontal positions parallel to the slot and to themselves, thereby preventing their natural tendency to jam in or adjacent the hopper slot when large numbers of the articles are deposited in the hopper. The invention also resides in the horizontal parallel bar receiver onto which the articles are fed by a power-operated reciprocable plunger which, when retracted, releases them to swing downward by gravity into parallel vertical suspended positions by pivoting around their enlarged bulbs and slide along the receiver and thence downward along an inclined runway connected to the receiver whence they are picked up individually either from the receiver or runway by mechanical handling mechanism beyond the scope of the present invention for subjecting them to further operations.

In the drawings,

FIG. 1 is a side elevation, partly in central vertical section, through the hopper assembly, taken along the broken line 1—1 in FIG. 2, of a hopper feeder for short rods, such as thermometer tubes, according to a preferred form of the invention with the retracted and advanced positions of the tube ejector plunger indicated by solid and dotted lead lines respectively;

FIG. 2 is a top plan view of the hopper feeder shown in FIG. 1, with the lower portion of the rod-holding runway omitted;

Figure 3A:
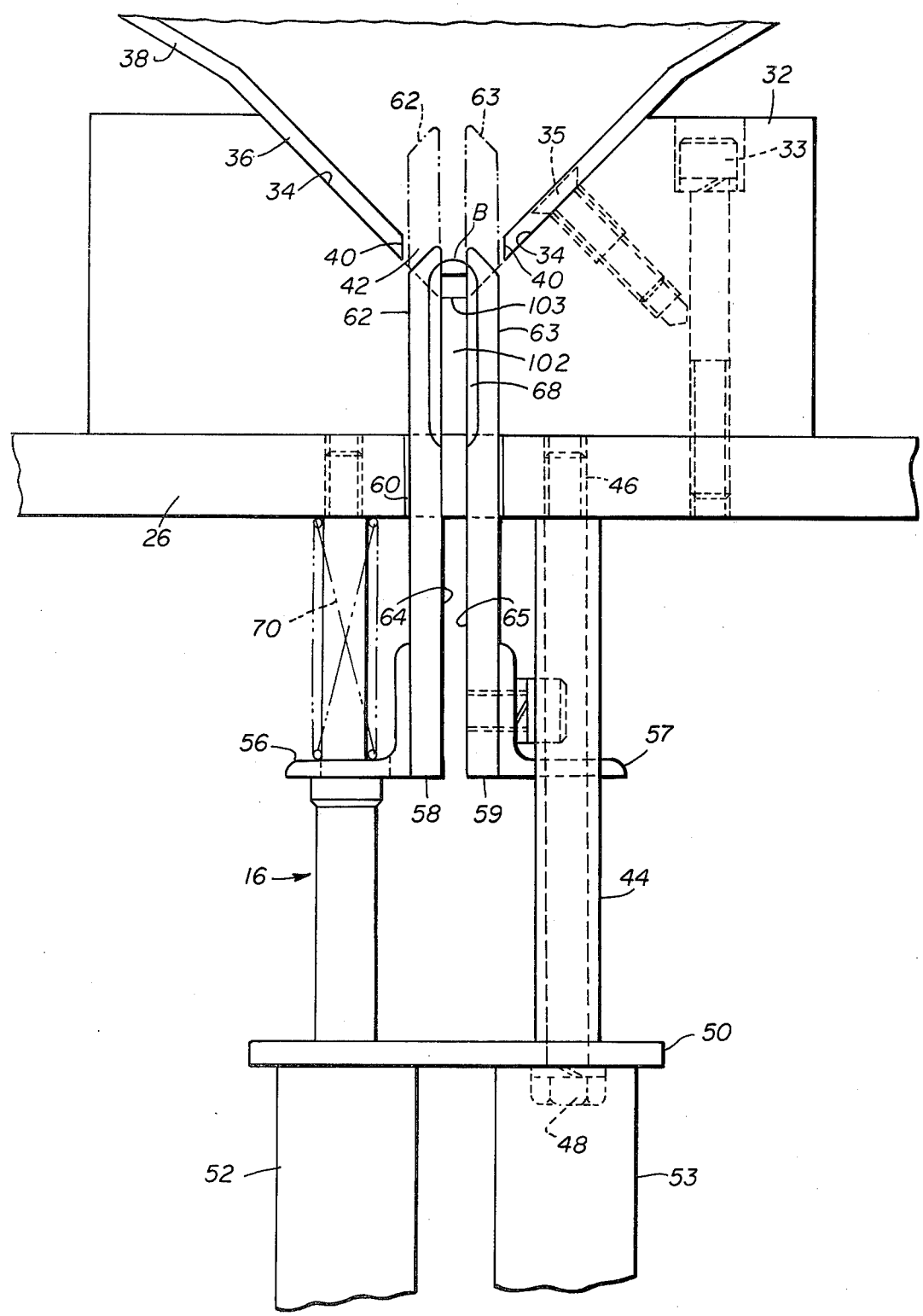
FIG. 3 is a vertical cross-section taken along the line 3—3 in FIG. 1 showing in solid lines the lowermost positions which the agitator plates reach and in dotted lines the maximum heights which their upper edges reach.

FIG. 3-A is an enlarged view of the central portion of FIG. 3;

FIG. 4 is an enlarged and inclined cross-section through the inclined rod-receiving runway, taken along the line 4—4 in FIG. 1; and FIG. 5 is a vertical cross-section taken along the line 5—5 in FIG. 1.

Referring to the drawings in detail, FIGS. 1, 2 and 3 show a singly-dispensing short rod feeder, generally designated 10, of short rods T, which term also includes tubes such as thermometer tubes. The feeder 10 consists generally of a supporting table 12 for a workpiece-receiving hooper 14 with a workpiece chamber 15 therein, beneath which is an agitator 16 for shaking the articles in the hopper 14 to prevent jamming or arching as they are fed one-by-one from the bottom of the hopper 14 by a feeding device 18 to a parallel-bar receiver 20 at the top of an inclined parallel-railed rod-holding runway 22 to a removal station 24 at the bottom of the runway 22.

The table 12 which supports the major subassemblies just mentioned consists of a rectangular plate-shaped table top 26 (FIGS. 1 and 2) bolted or otherwise secured to the upper ends of four tubular legs 28 mounted at the four corners of the table top 26 and with their lower ends adapted to rest upon a supporting surface 30 (FIG. 3). Mounted on the top of the table top 26 are two generally rectangular blocks 32 bolted or otherwise secured thereto as at 33 and having their upper facing corners cut away at approximately 45 degrees to provide inclined surfaces 34 facing one another. Bolted or otherwise secured as at 35 to and supported in part by the/inclined upper surfaces 34 of the blocks 32 are the further inclined lower portions 36 of the inclined bottom walls 38 of the hopper 14. The further inclined lower portions 36 of the bottom walls 38 have laterally-spaced edges 40 facing one another across a gap and collectively defining an elongated horizontal slot or workpiece outlet or discharge opening 42 through which the upper end of the agitator 16 moves upward and downward.

The agitator 16 is mounted upon and suspended from the table top 26 by elongated bolts 44, the upper ends of which are threaded into threaded holes 46 in the plate 26 and the lower ends of which have heads 48 which support a rectangular plate 50 to which the upper ends of parallel vertical fluid pressure cylinders 52 and 53 are bolted or otherwise secured in diagonally opposite positions (FIGS. 2 and 3). Secured to the upper ends of the piston rods 54 and 55 of the fluid pressure cylinders 52 and 53 are elongated crossheads 56 and 57, to the vertical faces of which are bolted or otherwise secured vertical agitator plates 58 and 59.

The agitator plates 58 and 59 are mounted in spaced parallel relationship and extend upward through an elongated rectangular opening 60 in the table top 26 and also through the elongated rectangular slot or workpiece outlet opening 42 between the opposite lower edges 40 of the hopper bottom walls 38. Each agitator plate 58 or 59 has an outwardly and downwardly-inclined or beveled upper edge face 62 or 63 which serves to separate and direct outward and upward all of the short rods, such as thermometer tubes T, except the single selected rod or tube T to be ejected. The latter falls between the spaced parallel upper edge faces 62 or 63 of the agitator plates 58 or 59 which are configured and spaced apart from one another a sufficient distance to receive, at one time only one short workpiece rod T, such as a thermometer tube with its slightly enlarged bulb at one end.

The upper portions of the spaced parallel inner surfaces 64 and 65 of the agitator plates 58 and 59 immediately below their upper edges 62 and 63 are shallowly-grooved to provide a vertically-elongated and widened cavity 68 at the top of which the selected thermometer tube or other workpiece rod T falls upon the top edge of a workpiece ejector plunger 102 movable back and forth between the agitator plates 58 and 59 and within the cavity 68, as explained more fully below. The cross heads 56 and 57 are resiliently urged downward by compression coil springs 70 which rapidly return the agitator plates 58 and 59 from their raised dotted-line positions (FIG. 3) to their lowered solid-line positions when the compressed air supply to the fluid pressure cylinders 52 or 53 is terminated. As will be seen later in the description of the operation of the invention, the fluid pressure cylinders 52 and 53 are preferably reciprocated alternately and intermittently to cause their respective agitator plates 58 and 59 to move upward and downward irregularly and independently of one another but preferably according to a predetermined programmed sequence to prevent jamming or arching of clumps of the workpiece rods T in criss-cross arrangements. As shown in FIG. 1, the workpiece rods T, such as thermometer tubes, are loaded into the hooper 14 with their bulbs facing forward.

In order to adapt the hopper 14 to slightly varying lengths of workpiece rods T, the forward side wall 72 and the rearward side wall 74 (FIG. 2) of the hopper 14 are made fixed and adjustable respectively. The adjustable wall 74 is mounted upon/angle brackets 76, one arm of each being slotted as at 78 to receive bolts 80 which provide horizontal adjustment motion for the angle brackets 76 and adjustable wall 74 relatively to the upturned parallel top portions 82 of the bottom walls 38.

The feeder 18 which/expels each individual rod or thermometer tube T after it drops onto the upper edge of the ejector plunger 102 at the top of the cavity 68 between the agitator plates 58, 59 includes an elongated horizontal fluid pressure cylinder or reciprocatory motor 84, one end of which is mounted on an inclined bracket 86 (FIGS. 1 and 2) which in turn is bolted or otherwise secured to the end of an elongated horizontal arm 88 which projects rearwardly from and is bolted to the table top 26. Secured to the outer end of the piston rod 90 of the cylinder 84 is a link 92 in the form of a rectangular plate having at its upper end a threaded connection 94 with the piston rod 90 and at its lower end attached to the rearward ends of a pair of laterally-spaced compression springs 96, the forward ends of which are connected to a rectangular block 98.

Secured as by clamping screws 100 to the spring-mounted block 98 is the rearward end of the previously-mentioned elongated thin workpiece ejector plunger 102. The forward part of the ejector plunger 102 is movable beneath the lower end of the hopper 14 immediately below the slot or horizontal workpiece discharge opening 42 (FIGS. 1 and 2, between opposite positions as shown by the solid and dotted lines designated 102 in FIG. 1. At the same time, the shoulder 103 on the upper edge of the ejector plunger 102 moves through the space immediately above the cavity 68 between the agitator plates 58 to engage and expel the selected single-headed workpiece rod or tube T outward to the left (FIG. 3) through a discharge opening 104, as shown by the dotted lines in FIG. 10 Meanwhile, the forward end 105 of the workpiece ejector plunger 102 moves from its retracted position to its advanced position (FIG. 2). Thereupon the head or bulb of the workpiece T comes to rest upon the inclined tops 106 of a pair of laterally-spaced horizontal bars 108 of the receiver 20 while the rod swings downward therebetween by gravity (FIG. 5). The bars 108 are secured at their opposite ends to vertical bars 110 which in turn are secured to the outer end wall 112 of the hopper 14. These parts collectively form the receiver 20.

The forward ends of the elongated horizontal guide bars 108 are bolted by tie bars 114 to the upper horizontal end portions 115 of laterally-spaced parallel guide rails 116 (FIG. 2) of the runway 22 and clamped together by a spacing bar 118 so as to maintain between them a spacing 120 which is wide enough for the passage of the rod portion of the workpiece T but too narrow for the passage of the head or bulb thereof. Accordingly, as the singleheaded short rods or thermometer tubes T swing downward between the bars 108 of the receiver 20 from their previously horizontal positions in the hopper 14 to their vertical positions between the bars 108 of the workpiece receiver 20, the workpieces T henceforth maintain their vertical positions in the space 120 between the parallel guide rails 116 (FIG. 4) pivoting around their respective single heads or bulbs B. Accordingly, as each workpiece T reaches the receiver 20 and swings downward to a vertical position, the next arriving workpiece acting in the same manner pushes the previously-arrived workpieces along the bars 108 onto the upper horizontal portions 115 of the guide rails 116, whereupon the workpieces T soon arrive at and slide downward along the elongated inclined portions 122 to the lower horizontal rail portions 124 (FIG. 1). The latter portions of the guide rails 116 are bolted in the same spaced parallel relationship to the top of a pedestal 126, from whence the workpieces T are removed either manually or by a conventional automatic workpiece handling device or robot (not shown) for further treatment in further steps of the method of manufacture.

In order to halt the operation of the feeding device 18 in response to the accumulation of a maximum desired number of workpiece tubes T on the runway 22, the latter is provided with a workpiece sensor 130 (FIG. 4) which straddles the space 120 and which is bolted as at 132 to the inclined portions 122 of the guide rails 116 at the lower ends of depending blocks 134 and 136, the latter in turn being secured as by the fasteners 138 to a cross bar 140 from the opposite ends of which depending members 142 and 144 are secured and extend downward. The sensor 130 includes a conventional high level limit valve connected to the penumatic circuit controlling the supply of compressed air to the fluid pressure cylinder 84.

To guard against damage to the fragile single-headed workpieces T, such as glass thermometer tubes, by a jamming thereof in the lower end of the hopper 14, particularly in the slot 42, an anti-jamming limit valve 150 is mounted on and bolted to the side of the elongated ejector plunger 102 (FIG. 1) and connected in controlling relationship to the pneumatic circuit supplying compressed air to the fluid pressure cylinder 84. The movable valve stem 152 of the valve 150 terminates in a head 154 which is spaced apart from but is engageable with a button 156 on the spring-mounted rectangular block 98. If, therefore, the above-mentioned jam occurs, the workpiece ejector rod 102 is forcibly halted and with it the block 98 to which it is attached. The link 92, however, continues to move to the left in FIG. 1, pushing the button 156 on the block 98 against the head 154 on the stem 152 of the valve 150, closing the valve and consequently shutting off further supply of compressed air to the horizontal fluid-pressure cylinder or reciprocatory motor until the jamming has been eliminated.

The operation of the hopper feeder for single-headed short rods has been broadly set forth above during the description of the construction thereof, hence it is believed that it is sufficient to summarize the operation at this point. The operator fills the hopper 14 with any desired number of single-headed short rod workpieces, such as the thermometer tubes T with their heads or bulbs facing forward toward the forward end wall 72 of the hopper 14. Compressed air is thereupon supplied to the pneumatic circuit which activates the fluid pressure cylinder 84 through a conventional valve or valves (not shown). The activation of the fluid pressure cylinder 84 and the consequent forward motion of its piston rod 90, link 92 and ejector plunger 102 causes the forward end of the latter to move to the left through the cavity 68 between the agitator plates 58 immediately below the slot 42 and causes its shoulder 103 to move against the rearward end of the selected single-headed workpiece rod or tube T, pushing the latter forward, with its enlarged head or bulb in the leading position onto the inclined faces 106 of the elongated horizontal guide bars 108, whereupon the workpiece T pivots around its enlarged head or bulb and swings downward into a vertical position. The pneumatic circuit then reverses the flow of compressed air to the cylinder 84, thereby pulling its piston rod outward to the right (FIGS. 1 and 2), thus retracting the forward portion of the ejector plunger 102 from the cavity 68 between the agitator plates 58, 59.

Although halted momentarily during reciprocation of the ejector plunger 102, the alternately-reciprocable agitator plates 58 and 59 meanwhile are moving upward and downward intermittently between their solid line positions and their dotted line positions (FIG. 3) to shake up the supply of workpieces T and prevent their jamming in the slot 42. In this manner, repeated operation of the workpiece feeding pneumatic cylinder 84 and its pivot plunger 90 by reciprocating the workpiece ejector rod 102 feeds the workpieces T one-by-one onto the receiver 20, each rod T swinging downward around its enlarged head or bulb as a pivot in the manner just described and shown in FIG. 4. Each successive workpiece T then pushes the preceding workpieces T along the guide blocks 108 and thence onto the upper horizontal portions 115 of the guide rails 116, whence they slide down the inclined portions 122 thereof onto the lower horizontal portions 124. There they are picked up by any suitable means for further processing, such as inspection and packaging.

Meanwhile, the agitator plates 58'59 are moving upward and downward intermittently through the slot 42 into the hopper 14, where they constantly agitate the workpieces T in the hopper 14 and cause them not only to resist jamming in the slot 42 but also to lie alongside one another in parallel contacting relationship to themselves and to the slot 42. Thence they slide by gravity down the inclined bottom walls 38 (FIG. 3) of the hopper 14 through the slot 42 between the lower edges of the bottom walls 38 and one by one fall upon the temporary rest formed by the upper edge of the ejector plunger 102 resiprocating in the cavity 68 between the agitator plates 58,59. In the manner previously described, they are pushed by the shoulder 103 from beneath the outlet slot 42 of the hopper 14 onto the guide blocks 108 where they swing downward into their vertical positions which they henceforth occupy (FIG. 4).

In this manner, the single-headed workpieces T accumulate between the guide blocks 108, whence they are pushed by the next arriving workpieces T onto the upper horizontal positions 115 of the guide rails 116 and thence down their inclined portions 122 to the lower horizontal arms 124 of the guide rails 116. In the manner previously described, the sensor 130 controls the permissible number of workpieces T which can accumulate on the guide rails 116 of the runway 22 from the receiver 20 and temporarily halts the operation of the pneumatic feeding cylinder 84 until the workpieces T are removed from the dispensing station 24 at the lower end of the runway 22. Meanwhile, in the manner described above, any jamming which occurs at the bottom of the hopper 14 is halted by the anti-jamming valve 150 until the obstruction is cleared away, after which the normal operation described above is resumed.

It will be understood by those skilled in this art that the workpieces T are not necessarily rods or tubes of circular crosssection—in fact, clinical thermometers are more nearly of rounded-cornered triangular cross-section. It will also be evident that tubes or rods T without heads or bulbs can be handled by the present hopper feeder 10 by omitting the inclined runway 22 and narrowing the gap between the guide blocks 108 of the receiver 20 so that the rods or tubes T will not drop through that gap. Such headless or bulbless rods or tubes T can then be picked directly off the receiver 20 by suitable conventional means, such as by a conventional robot beyond the scope of the present invention and forming no part thereof.

I claim:

1. A hopper feeder for singly-moving short rod workpieces comprising a supporting structure, a workpiece-receiving hopper mounted on said structure and having spaced side walls and inclined downwardly-converging bottom walls defining a workpiece chamber with an elongated outlet opening disposed therebelow and a discharge opening disposed in spaced relationship thereto, a pair of workpiece agitator members disposed side by side in spaced parallel relationship below said outlet opening and movable relatively to one another upward and downward in opposite directions past said outlet opening into and out of said workpiece chamber, power-operated means for moving said workpiece agitator members upward and downward relatively to one another past said outlet opening, a workpiece receiver mounted adjacent said hopper in alignment with said workpiece discharge opening, a workpiece ejector mounted between said agitator members for substantially horizontal reciprocation between positions adjacent said outlet opening and said discharge opening respectively to push a single workpiece from said position adjacent said outlet opening to said position adjacent and through said discharge opening onto said workpiece receiver, and power-operated means for reciprocating said workpiece ejector horizontally across said outlet opening in timed relationship with said power-operated means for moving said workpiece agitator.

2. A hopper feeder, according to claim 1, wherein said agitator members include agitator plates with opposite top workpiece-engaging surfaces inclined away from one another.

3. A hopper feeder, according to claim 1, wherein said workpiece agitator-moving means includes a pair of independently-movable fluid pressure reciprocatory motors, one of said motors being operatively connected to each agitator member.

4. A hopper feeder, according to claim 1, wherein the workpiece has an enlargement forming a head near one end thereof, wherein said workpiece receiver includes a pair of elongated workpiece-receiving elements disposed in spaced parallel horizontal relationship with the spacing therebetween greater than the thickness of the rod workpiece but less than the thickness of the head upon the rod workpiece, whereby the rod portion of the workpiece deposited by the workpiece ejector upon the workpiece receiver swings downward through the space between said workpiece receiving elements while pivoting around the workpiece head, wherein a workpiece dispenser is disposed below said workpiece receiver in horizontally and vertically-spaced relationship therewith, wherein an inclined ejected workpiece runway aligned with said workpiece receiver extends downward therefrom to said dispenser, and wherein said ejected workpiece runway includes a pair of elongated members disposed in the same spaced parallel relationship as said workpiece receiving elements and are alignedly connected thereto.

* * * * *